United States Patent Office 3,314,976
Patented Apr. 18, 1967

3,314,976
7,16-DIALKYL-PREGNANES
Colin Leslie Hewett, Bearsden, Glasgow, and Gilbert Frederick Woods, Bishopbriggs, Glasgow, Scotland, assignors to Organon Inc., West Orange, N.J., a corporation of New Jersey
No Drawing. Filed Sept. 28, 1964, Ser. No. 399,891
Claims priority, application Great Britain, Oct. 4, 1963, 39,198/63; Mar. 4, 1964, 9,149/64
3 Claims. (Cl. 260—397.3)

This invention relates to novel biologically active compounds of the pregnane series and to processes for the preparation thereof.

More particularly, the invention relates to the preparation of a group of new 7,16-dialkyl-steroids of the pregnane series having the formula—

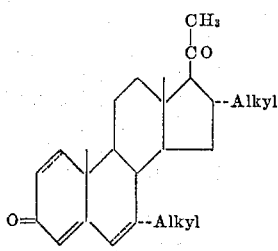

wherein $C_1$-$C_2$ and $C_6$-$C_7$ may be saturated or unsaturated. The alkyl groups in the 7 and 16 positions are saturated aliphatic hydrocarbon radicals having 1-4 carbon atoms, e.g., a methyl, ethyl, propyl, isopropyl and butyl radical.

The compounds according to the invention are of great importance on account of their progestational, particularly long-acting progestational activity, anti-ovulatory and gonad-inhibiting properties. They can be prepared by reacting a $\Delta^6$-16$\alpha$-alkyl-progesterone, in which the 20-keto group is temporarily protected, with an alkyl Grignard reagent, preferably the alkyl magnesium bromide or iodide. The 20-keto group may be protected, for example, by forming the ethylene dioxy ketal or by reducing to the 20-hydroxyl group. A double bond may be introduced at carbon atoms 1 and 2 and/or 6 and 7 in the thus obtained $\Delta^4$-3-keto-7$\alpha$-alkyl steroid, and the 20-keto group may be regenerated either before or after these reactions.

The alkylation reaction is performed in the presence of a cuprous halide, e.g., cuprous chloride or cuprous bromide or a cupric acylate, e.g., cupric acetate, in a suitable solvent, e.g., an aliphatic ether such as dioxan or tetrahydrofuran or a hydrocarbon such as benzene or toluene. The desired product can be obtained by decomposing the Grignard complex with an aqueous solution of ammonium chloride.

The introduction of the 7-alkyl-substituent, which takes place by 1,6-addition with an alkyl Grignard reagent, normally leads to the 7$\alpha$-alkyl-steroids, but under certain reaction-conditions, e.q. carrying out the 1,6-grignardation at room temperature, a mixture is obtained of the 7$\alpha$-, and 7$\beta$-alkyl-steroid, which can be separated in a known manner.

The regeneration of the 20-keto group can be achieved by treatment with an acid in the case of a ketal or by oxidation in the case of a 20-hydroxyl group.

The introduction of the $\Delta^1$-double bond may, if desired, be brought about by any chemical or microbiological method known to be suitable for this purpose.

A conventional chemical method consists in that the $\Delta^1$-double bond is introduced by treatment of the $\Delta^4$-3-keto steroid with a suitable quinone or selenium dioxide. The selenium dehydrogenation is performed preferably in a tertiary alcohol such as t-butanol as solvent. Microbiologically, the double bond may be introduced by incubation with, e.g., *Bacillus sphaericus* or with *Corynebacterium simplex* ATCC 6946.

After introduction of the 7 alkyl group a double bond may be re-introduced at carbon atoms 6 and 7 in either the $\Delta^4$-7-alkyl steroid or the $\Delta^{1,4}$-7-alkyl steriod to obtain the corresponding $\Delta^{4,6}$-7-alkyl- or the $\Delta^{1,4,6}$-7-alkyl steroids. The $\Delta^6$-double bond may be introduced by known methods, for example by treatment of the $\Delta^4$-7-alkyl or the $\Delta^{1,4}$-7-alkyl steroids with a quinone having an oxidation reduction potential of less than —0.5 and preferably having a redox potention of between —0.65 and —0.90, such as chloranil, 1,2-naphtha-quinone and 1,4-naphtha-quinone.

For the introduction of the $\Delta^6$-bond into a $\Delta^4$-3-keto-7-alkyl-, or $\Delta^{1,4}$-3-keto-7-alkyl-steroid with a quinone it is necessary to start from the 7$\beta$-alkyl isomer as the 7$\alpha$-alkyl compound fails to undergo dehydrogenation.

Another route for the preparation of the desired $\Delta^6$-7-alkyl-compounds is to start from a $\Delta^5$-3-acyloxy-16$\alpha$-alkyl-pregnene, oxidizing this compound e.g. with sodium chromate to the corresponding 7-keto-compound, treating this compound with an alkyl metal derivative, e.g. an alkyl Grignard reagent or alkyllithium, to obtain the corresponding 7-hydroxy-7-methyl steroid, which is converted into the desired $\Delta^{4,6}$-3-keto-7-alkyl-steroid by oxidation of the $\Delta^5$-3-hydroxyl group into the $\Delta^4$-3-keto group and dehydration of the 7-hydroxyl group.

It may be possible too to introduce the $\Delta^1$-, and $\Delta^6$-bonds simultaneously by halogenation, preferably bromination of the $\Delta^4$-3-keto-7-alkyl-steroid in 2-, and 6-position, followed by dehydrohalogenation, e.g., by treatment with collidine, lithium carbonate or aragonite.

The starting materials may be prepared from 16$\alpha$-alkyl-pregnenolone which may be reduced or ketalised in the 20-position, after which the $\Delta^5$-3-hydroxy group is converted to the $\Delta^4$-3-keto group. The thus obtained 16$\alpha$-alkyl-progesterone is treated with a suitable quinone for the introduction of the $\Delta^6$ double bond.

The invention is illustrated by the following examples.

*Example 1*

A solution of 16$\alpha$-ethyl pregnenolone acetate (30 g.) in benzene (1050 ml.) was treated with ethylene glycol (85 ml.) and 2,4-dinitrobenzene sulphonic acid (1 g.) and the solution refluxed vigorously for 65 hours collecting the water formed in the reaction in a Dean and Stark separator. The cooled reaction mixture was then treated with excess solid potassium carbonate and diluted with ether and water. The organic layer was washed repeatedly with water until neutral, dried over sodium sulphate and evaporated to dryness. Two crystallisations of the residue from methanol containing a trace of pyridine gave 16$\alpha$ - ethyl - pregn - 5 - en - 3$\beta$ - ol - 20 - one - 20 - ethylenedioxyketal acetate (16.5 g.) ($\Delta^5$-3$\beta$-acetoxy-16$\alpha$-ethyl-20-ethylenedioxy-pregnene).

*Example II*

To a solution of 10 g. of $\Delta^5$-3$\beta$-acetoxy-16$\alpha$-ethyl-20-ethylenedioxy-pregnene in 100 ml. of tetrahydrofuran there was added 2.4 g. of potassium hydroxide dissolved in 30 ml. of methanol. The reaction mixture was stirred for 3 hours at room temperature under nitrogen. The mixture was poured out into 2 l. of water. After filtration, washing with water till neutral, the yield of the free alcohol was 8 g.

*Example III*

A solution of 4.5 gms. of $\Delta^5$-3$\beta$-hydroxy-16$\alpha$-ethyl-20-ethylenedioxy pregnene in 50 ml. of toluene and 25 ml. of cyclohexanone was distilled to remove traces of water, about 5 cc. of solvent being distilled off. A solution of 4.5 gms. of aluminium propoxide in 10 ml. of toluene was added and the whole refluxed for 45 minutes, cooled, decomposed with a solution of Rochelle salt, and the product isolated by removal of volatile matter by steam distillation. The crude material was purified by chromatography on Super-Cel in ether-benzene to yield 3.0 gm. of pure $\Delta^4$-3-keto-16α-ethyl-20-ethylene dioxy-pregnene.

Example IV

A solution of 5 g. of $\Delta^4$-3-keto-16α-ethyl-20-ethylene dioxy-pregnene, 5 g. of chloranil and 80 ml. of t-butyl alcohol was refluxed for 1 hour, then concentrated under vacuum to a small volume. The resulting residue was taken up in methylene chloride and, after filtering through 25 g. of Super-Cel was washed with dilute sodium hydroxide and with water until neutral.

The solvent was removed in vacuo. The residue chromatographed on Super-Cel, giving 2 g. of $\Delta^{4,6}$-3-keto-16α-ethyl-20-ethylenedioxy-pregnadiene.

$\lambda_{max.}^{alc.}$ 285 m$\mu$ ($\epsilon$: 26,350)

Example V

To a stirred solution of 50 ml. of commercial 3 M ethereal methyl magnesium bromide in 100 ml. of tetrahydrofuran at 0° C., under nitrogen, was added 0.9 g. of cuprous bromide followed by 4.9 g. of $\Delta^{4,6}$-3-keto-16α-ethyl-20-ethylenedioxy-pregnadiene in 130 ml. of tetrahydrofuran. The mixture was stirred for 25 minutes and then poured on to a mixture of ice, ether and ammonium chloride. The ether phase was separated and washed twice with ammonium chloride solution then with dilute sodium hydroxide saturated with sodium chloride and twice with saturated sodium chloride.

Each aqueous phase was again extracted with ether. The extracts were combined and dried over anhydrous sodium sulphate, and the solvent removed in vacuo. Chromatography on a column of Super-Cel gave the main product ($\Delta^4$-3-keto-7α-methyl-16α-ethyl-20-ethylenedioxy-pregnene) which was contaminated with some 3-keto-7β-methyl-16α-ethyl-20-ethylenedioxy-$\Delta^4$-pregnene, and some 3,20-diketo-7-methyl-16α-ethyl-$\Delta^4$-pregnene.

$\lambda_{max.}^{alc.}$ 243 m$\mu$, $\epsilon$: 15950

Example VI

To a solution of 3 g. of $\Delta^4$-3-keto-7α-methyl-16α-ethyl-20-ethylenedioxy-pregnene in 120 ml. of methanol was added 2 ml. 30% hydrochloric acid. After 3 hours at 20° the solution was diluted with water and extracted with methylene chloride. After drying over anhydrous sodium sulphate, the methylene chloride was evaporated in vacuo.

The residue was crystallised from acetone hexane to yield the pure $\Delta^4$-3,20-diketo-7α-methyl-16α-ethyl-pregnene.

Example VII 1 g. of $\Delta^4$-3,20-diketo-7α-methyl-16α-ethyl-pregnene, 1 g. of 2,3-dicyano-5,6-dichloro-benzoquinone in 20 ml. of purified dioxan were refluxed for 10 hours. After cooling, the precipitate was filtered off and to the filtrate was added methylene chloride. The solution was washed four times with water, four times with 2.5% sodium bicarbonate solution and finally with water until neutral.

After drying over anhydrous sodium sulphate, the methylene chloride was evaporated in vacuo.

The residue was dissolved in a little benzene and added to a column of Super-Cel. Elution with benzene-ether mixtures gave 0.5 g. of $\Delta^{1,4}$-3,20-diketo-7α-methyl-16α-ethyl-pregnadiene. Crystallisation from methanol-water gave 0.35 g. of the pure compound.

$\lambda_{max.}^{alc.}$ 223 m$\mu$, $\epsilon$: 10,900; 254 m$\mu$, $\epsilon$: 9600; 299 m$\mu$, $\epsilon$: 12,400

Example VIII

A mixture of $\Delta^4$-3,20-diketo-16α-ethyl-7α-methyl-pregnene and $\Delta^4$-3,20-diketo-16α-ethyl-7β-methyl-pregnene was obtained by deketalisation of the crude product isolated from a Grignard reaction such as that described in Example V. A brisk stream of HCl gas was passed through a solution of the crude mixture of 7α- and 7β-methyl compounds (25 g.) in dioxan (190 cc.) for 15–20 minutes keeping the temperature below 40° C. The solution was treated with water (25 cc.) and then a solution of chloranil (20 g.) in doxan (315 cc.) and the final solution allowed to stand at 45° C. for 18 hours in the dark. The product was isolated by extraction with methylene chloride and the extract was washed four times with water, four times with 0.25 N NaOH and finally with water to neutrality, the work-up being carried out away from direct light. The dried extract was evaporated to give a solid (18 g.) which was crystallised from ether-hexane and then chromatographed on a column of Super-Cel to give $\Delta^{4,6}$ - 3,20 - diketo - 16α - ethyl-7-methyl-pregnadiene (4.2 g.).

$\lambda_{max.}^{alc.}$ 287 m$\mu$ ($\epsilon$ =26,100)

Example IX

In an analogous manner to that described in the foregoing examples 16α-isopropyl pregnenolone acetate was converted into $\Delta^4$-3,20-diketo-7α-methyl - 16α - isopropyl-pregnene and $\Delta^4$-3,20-diketo-7β-methyl - 16α - isopropyl-pregnene. The latter was dehydrogenated with chloranil to give $\Delta^{4,6}$-3,20-diketo-7-methyl-16α-isopropyl-pregnadiene.

In the same way 16α-methyl-pregnenolone acetate and 16α-propyl-pregnenolone acetate were converted into $\Delta^4$-3,20-diketo-7α,16α-dimethyl-pregnene and $\Delta^4$-3,20-diketo-7α-methyl-16α-propyl-pregnene.

Example X $\Delta^{4,6}$-3,20-diketo-7-methyl-16α-ethyl-pregnadiene (1 g.) and 2,3-dicyano-5,6-dichloro-benzoquinone in purified dioxan (20 cc.) were refluxed for 10 hours. After cooling, the precipitate was filtered off, and the product extracted from the mother liquors with methylene chloride. The extract was washed four times with water, four times with 0.25 N NaOH solution and finally with water until neutral. The dried extract was evaporated to dryness and the solid residue crystallised from ether/methylene chloride to give $\Delta^{1,4,6}$ - 3,20 - diketo - 7-methyl-16α-ethyl-pregnatriene (0.31 g.).

$\lambda_{max.}^{alc.}$ 226 m$\mu$ ($\epsilon$ =11,000); 225 m$\mu$ ($\epsilon$ =9,950); 303 m$\mu$ ($\epsilon$ =12,200)

Example XI

In the manner as described in Example VIII $\Delta^4$-3,20-diketo - 7,16α - dimethyl - pregnene and $\Delta^4$-3,20-diketo-7-methyl-16α-propyl-pregnene were converted into the corresponding $\Delta^6$-derivatives.

Example XII

A mixture of 1 gm. of $\Delta^4$-3,20-diketo-7α,16α-dimethyl-pregnene, 400 mg. of selenium dioxide, 1 ml. of acetic anhydride and 50 ml. of tertiary butanol was refluxed for 48 hours. The mixture was decanted from the precipitated selenium and evaporated to dryness after the addition of ethanol. The residue was dissolved in a little benzene and chromatographed over silicagel. Elution with a mixture of benzene and ether gave 0.68 g. of $\Delta^{1,4}$-3,20-diketo-7α,16α-dimethyl-pregnadiene.

In the same way $\Delta^4$-3,20-diketo-7α-methyl-16α-propyl-pregnene and $\Delta^{4,6}$ - 3,20 - diketo - 7-methyl-16α-isopropyl-pregnadiene were converted into the corresponding $\Delta^1$-derivatives.

Example XIII

In the manner as described in Example X $\Delta^{4,6}$-3,20-diketo-7,16α-dimethyl-pregnadiene and $\Delta^{4,6}$-3,20-diketo-7-methyl-16α-propyl-pregnadiene were converted with 2,3 - dicyano - 5,6 - dichlorobenzoquinone into the corresponding $\Delta^1$-derivatives.

Example XIV

In accordance with the methods as described in the foregoing examples 16α-butyl prognenolone acetate was converted into Δ⁴-3,20-diketo-7α-methyl-16α-butyl-pregne and Δ⁴-3,20-diketo-7β-methyl-16α-butyl-pregnene. Treatment of the latter in the manner as described in the Example VIII, and X yielded the corresponding Δ⁶-, and Δ¹,⁶-derivatives thereof.

Example XV

Two liters of a medium containing 0.5 gm. of yeast extract, 0.5 gm. of pepton and 0.5 gm. of glucose per liter, were sterilized in a 5 l. fermentation vessel for 30 minutes at 120° C. and next inoculated with Corynebacterium simplex cultivated on a medium of agar. Next the culture was incubated for 16 hours at 25° C. passing air through the culture. Next was added a solution of 1.5 gm. of Δ⁴-3,20-diketo-7α-methyl-16α-butyl-pregnene in methanol. The culture was shaken for 24 hours at 28° C. and subsequently extracted with methylene-chloride. The extract was washed with water, and evaporated in vacuo. The residue was recrystallised from methanol-water to give Δ¹,⁴-3,20-diketo-7α-methyl-16α-butyl-pregnadiene.

Example XVI 5.52 g. of Δ⁵-3,20-diacetoxy-16α-ethyl-pregnene were added to a solution of 7.64 g. of Na₂CrO₄—4H₂O, 3.97 g. of sodium acetate, 35 ml. of benzene, 53 ml. of acetic and 39 ml. of acetic acid anhydride. After standing for 3 days the reaction mixture was poured out into 1 l. of ice water. After extraction with methylene chloride the extracts were washed with 5% sodium bicarbonate solution and with water till neutral, dried on sodium sulphate and evaporated in vacuo. The residue was crystallized from ethanol to give 3.3 g. of Δ⁵-3β,20-diacetoxy-7-keto-16α-ethyl-pregnene. Melting point is 220.5°–221° C.

7.35 g. of lithium were flatted, cut in small pieces and added to 250 ml. dry ether. A solution of 49.5 ml. of methyl iodide in 100 ml. of ether was added, while stirring for 1½ hours, keeping the ether under reflux. After an additional stirring for 1 hour a solution of 9.42 g. of Δ⁵-3β,20-diacetoxy-7-keto-16α-ethyl-pregnene in 350 ml. tetrahydrofuran was added. After two hours reflux, the reaction mixture was cooled and the excess methyl lithium was destroyed with 80 ml. of methanol. To the reaction mixture was added cautiously 1400 ml. of water. After extraction with benzene, the extracts were washed with water till neutral and dried on sodium sulphate. The extracts were evaporated in vacuo till dryness giving 8 g. of crude Δ⁵-3β,7β,20-trihydroxy-7α-methyl-16α-ethyl-pregnene, which was used for the next reaction. A pure sample of this compound gave a melting point of 222–228° C. To a solution of 10.77 g. of the above crude product in 65 ml. of cyclohexanone and 215 ml. of toluene was added a solution of 4.95 g. of aluminiumisopropylate in 195 ml. of toluene.

After reflux for 1 hour the mixture was cooled to 40° C. After adding a solution of 14.8 g. of Rochelle salt in 45 ml. of water, the reaction mixture was steam distilled for about 2 hours. (Distillate about 2.5 l.) The oily precipitate was extracted with methylene dichloride. The extracts washed with water till neutral, dried on sodium sulphate and evaporated till dryness.

The crude product was dissolved in 100 ml. of acetone. After cooling to −10° C. 14 ml. of a 8 N CrO₃ solution were added. After stirring for another 15 minutes at −10° C. the excess of CrO₃ was destroyed with methanol. The reaction mixture was poured into ice water. Extraction with methylenedichloride and the usual working up afforded 9.3 g. of a crude product, which was chromatographed on 280 g. of silica gel. Elution with benzene 20% ether yielded 5.01 g. Δ⁴,⁶-3,20-diketo-7-methyl-16α-ethyl-pregnadiene, which after crystallization from ether had the melting point: 118–118.5° C.

We claim:

1. Novel steroid compounds of the formula:

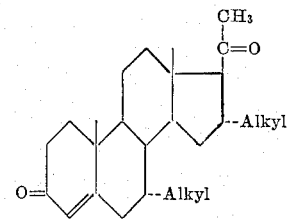

wherein the alkyl groups at carbon atoms 7 to 16 are saturated aliphatic hydrocarbon radicals having 1–4 carbon atoms.

2. 7α-methyl-16α-alkyl-progesterones, wherein the alkyl group is a saturated aliphatic hydrocarbon radical having 1–4 carton atoms.

3. 7α-methyl-16α-ethyl-progesterone.

References Cited by the Examiner

UNITED STATES PATENTS

| 2,882,282 | 4/1959 | Agnello et al | 260—397.3 |
| 3,002,005 | 9/1961 | Campbell et al. | 260—397.3 |
| 3,126,374 | 3/1964 | Ringold et al. | 260—239.55 |

FOREIGN PATENTS

| 896,103 | 5/1962 | Great Britain. |

OTHER REFERENCES

Fieser et al., Steroids, pp. 692–696 (1959), Reinhold Pub. Co., New York.

LEWIS GOTTS, *Primary Examiner.*

HENRY A. FRENCH, *Assistant Examiner.*